US007562203B2

(12) United States Patent
Scott et al.

(10) Patent No.: US 7,562,203 B2
(45) Date of Patent: Jul. 14, 2009

(54) STORAGE DEFRAGMENTATION BASED ON MODIFIED PHYSICAL ADDRESS AND UNMODIFIED LOGICAL ADDRESS

(75) Inventors: John A. Scott, Cary, NC (US); Eric C. Hamilton, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 365 days.

(21) Appl. No.: 11/528,984

(22) Filed: Sep. 27, 2006

(65) Prior Publication Data

US 2008/0077762 A1    Mar. 27, 2008

(51) Int. Cl.
G06F 12/00    (2006.01)
(52) U.S. Cl. ............................ 711/165; 711/4; 711/112; 711/170; 711/203
(58) Field of Classification Search .................. 711/165, 711/4, 112, 170, 203; 707/200
See application file for complete search history.

(56) References Cited

U.S. PATENT DOCUMENTS 7,181,585 B2 *   2/2007   Abrashkevich et al. ...... 711/170
7,409,522 B1 *   8/2008   Fair et al. .................... 711/170
7,409,527 B2 *   8/2008   Hu ............................... 711/219
2005/0021900 A1    1/2005   Okuyama et al.
2005/0187985 A1    8/2005   Edwards et al.
2005/0228963 A1   10/2005   Rothman et al.
2006/0149899 A1    7/2006   Zimmer et al.

FOREIGN PATENT DOCUMENTS

WO    WO 93/00635    1/1993

OTHER PUBLICATIONS

Wikipedia, "Network-Attached Storage", http://en.wikipedia.org/wiki/Network-attached_storage, printed Jun. 28, 2006, pp. 1-5.
Wikipedia, "Storage Area Network", http://en.wikipedia.org/wiki/Storage_area_network, printed Jun. 28, 2006, pp. 1-4.

* cited by examiner

*Primary Examiner*—Stephen C Elmore
(74) *Attorney, Agent, or Firm*—Blakely, Sokoloff, Taylor & Zafman LLP (57) ABSTRACT

A method in a storage system reads blocks having both physical addresses and logical addresses in the storage system from a first set of locations in non-volatile storage to a cache memory and determines the level of data fragmentation in the non-volatile storage. If the level of data fragmentation exceeds a threshold level, the cache memory is marked and the blocks are written to physically sequential locations with new physical addresses in the non-volatile storage at a data consistency point without changing the logical addresses of the blocks.

31 Claims, 7 Drawing Sheets

STORAGE DEFRAGMENTATION BASED ON MODIFIED PHYSICAL ADDRESS AND UNMODIFIED LOGICAL ADDRESS

FIELD OF THE INVENTION

Embodiments of the present invention pertain to data storage systems and, more particularly, to a technique for defragmenting a storage device.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer." A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

A storage server typically includes one or more file systems. A file system, as the term is used here, is a structured (e.g. hierarchical) set of stored data, such as files, directories and/or other types of data containers. As a file system ages and services client-initiated write requests, data and free space tend to become fragmented, a process that accelerates as the amount of free space decreases. As a result of fragmentation, read and write performance tend to degrade over time.

Fragmentation can be reduced by moving (relocating) data on disk, a process known as defragmentation. However, defragmentation can be expensive from a performance standpoint. Reads of existing data on disk in preparation for relocation may compete with the servicing of client requests, discouraging relocation in heavily-loaded systems that would most benefit from it.

SUMMARY

Embodiments of the present invention include methods of operating a storage system. In one embodiment, a method includes reading blocks to a cache memory from a first set of locations in non-volatile storage, determining a level of data fragmentation of the blocks, marking the blocks for relocation in the non-volatile storage if the level of data fragmentation exceeds a threshold level and writing the plurality of blocks to a second plurality of locations in the non-volatile storage at a consistency point, wherein the second plurality of locations comprises contiguous locations in the non-volatile storage, and wherein the second plurality of locations does not overwrite the first plurality of locations.

In one embodiment, a method includes maintaining a first set of pointers and a second set of pointers to data stored in a storage system, where the first set of pointers includes physical pointers that define physical locations of a set of blocks in the storage system and the second set of pointers includes logical pointers that define logical locations of each of the blocks in the storage system. The method further includes reading a set of blocks from non-volatile storage in response to a read request, determining a level of fragmentation associated with the read request and, if the level of fragmentation exceeds a predetermined threshold level, modifying the physical pointers associated with each block of the set of blocks so that the set of blocks are stored in contiguous locations in the non-volatile storage, without modifying the logical pointer to any block of the set of blocks Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for defragmentation in a storage system are described. In one embodiment, blocks in a storage system are assigned both a physical address in the storage system and a logical address in the storage system. Data fragmentation can be detected during data read operations as blocks are copied from non-volatile storage to cache memory. Data defragmentation is performed in a subsequent write operation at a data consistency point by assigning new, sequential physical addresses to the blocks while leaving the logical addresses of the blocks unchanged.

References in this specification to "an embodiment", "one embodiment," or the like, mean that the particular feature, structure or characteristic being described is included in at least one embodiment of the present invention. However, occurrences of such phrases in this specification do not necessarily all refer to the same embodiment.

TERMS AND DEFINITIONS

Terms and definitions used in the following description are collected below to assist readers in understanding the various embodiments of the invention described herein.

A "file system" is a structured (e.g., hierarchical) set of stored files, directories and/or other data containers. The "active file system" is that portion of the file system that resides in the internal memory of a storage server at any point in time.

"Metadata" is data that describes other data.

A "write-anywhere file system" is a file system that is not constrained to write data or metadata (or any type of data or metadata) to any particular location on disk (or other form of non-volatile storage). A write-anywhere file system has the capability to write to any unallocated block on any available disk. A write-anywhere file system can be used to write out-of-place. That is, when data is modified after being read to memory from a location on a disk, the modified data is written to a new physical location on the disk so that the previous, unmodified version of the data is retained. This mode of operation is in contrast to a write in-place file system, where modified data is written back to its original physical location on the disk, overwriting the older data. WAFL® is the Network Appliance proprietary Write Anywhere File Layout file system, part of the Data ONTAP® storage operating system available from Network Appliance of Sunnyvale, Calif.

An "aggregate" is a logical aggregation of physical storage combining one or more physical mass storage devices (e.g., disks), or parts thereof, into a single logical storage object that contains or provides storage for one or more other logical data sets at a higher level of abstraction, such as a volume (q.v.).

A "volume" is a logical data set, an abstraction of physical storage combining one or more physical mass storage devices (e.g., disks), or parts thereof, into a single logical storage object managed as a single administrative unit (e.g., a file system). A volume may be defined within a larger group of available storage, such as an aggregate. A volume may be broken down into logical data sets (storage objects), which may contain one or more RAID groups (q.v.).

A "flexible volume" is a volume that is flexibly associated with the underlying physical storage (e.g., an aggregate), such that there does not have to be a one-to-one relationship between a flexible volume and an aggregate.

A "logical unit number" (LUN) is a logical data container (another type of logical storage container). A LUN may be a virtual partition of a RAID group (q.v.). For example, a LUN may be formed as a "stripe," that is one or more blocks wide, across the disks in a RAID group, where a block may be, for example, a 4 Kbyte extent of storage space. A LUN appears to a user as a physical storage device, such as a disk. LUN is defined by the SCSI Standard of the T10 technical committee of the International Committee on Information Technology Standards.

A "RAID" or "RAID group" is a redundant array of independent disks, configured to provide cost-effective data integrity and redundancy.

A "buffer" is a temporary data cache in the internal memory of a filer, where data is stored for read and/or write operations, for example.

A "dirty buffer" is a buffer containing data that has been modified since it was read from disk to the buffer and, as a result, does not match the on-disk data (e.g., as a result of a user initiated write request).

A "clean buffer" is a buffer containing data that matches the on-disk data (i.e., a buffer containing unmodified data).

A "pseudo-dirty buffer," as used herein, is a buffer containing unmodified but fragmented data.

A "consistency point" (CP) is a point in time at which new or modified data that has been cached in a storage server's memory (e.g., in response to one or more writes) is committed to non-volatile storage (e.g., disk storage or a nonvolatile write cache), so that the state of data in non-volatile storage is consistent with all client write requests received to that point in time. Typically, consistency points are established periodically (e.g., every ten seconds).

A "buffer tree" is a hierarchical data structure used by a file system to keep track of the locations of the blocks of a file. A buffer tree includes one or more levels of indirect blocks (e.g., "L1 blocks," "L2 blocks," etc.), each of which contains one or more pointers to lower level indirect blocks and/or to data blocks (L0 blocks).

A "block" is a contiguous set of data of a known length starting at a particular offset value.

An "indirect block" is a block that containers pointers to other blocks, not real data. Any block that is not at the lowest level of a buffer tree is an indirect block.

A "direct block" is a block that contains real data, not just pointers and/or metadata. Also called a "Level 0" (L0) block. A block at the lowest level of a buffer tree.

A "disk block number" (DBN) is the sequential position of a physical block on a particular disk.

A "file block number" (FBN) is the logical (sequential) position of a block within a file. In the Network Appliance WAFL® system, the FBN maps to a virtual volume block number (VVBN) and a physical volume block number (PVBN).

A "segment" is a set of consecutively addressed disk block numbers that is allocated to consecutive file block numbers in a single file.

A "virtual volume block number" (VVBN) is an address of a block in a flexible volume (i.e., the offset of the block from a starting address within a flexible volume. Also, the offset (the FBN) of the block within the container map.

A "physical volume block number" (PVBN) is an address of a physical block in an aggregate or in a traditional (non-flexible) volume.

A "container map/file" is a metadata structure that maps VVBNs to PVBNs.

An "inode" is a metadata container that is used to store metadata about a file, such as ownership of the file, access permission for the file, size of the file, file type and pointers used to locate the blocks of the file. The inode of a file is the highest level indirect node (i.e., the root node) of a buffer tree. Inodes may be stored in a separate inode file. An inode in memory may be associated with a metadata flag to indicate if the buffer tree is dirty (i.e., that the inode in memory, or any data in memory that it points to, has been modified) or if the buffer tree is clean (i.e., is in a consistency point).

A "superblock" is a metadata container that contains overall metadata about a stored data set (e.g., a volume or aggregate), including the locations of other metadata structures associated with the data set. A superblock contains a pointer to the root node (inode) of each buffer tree in the inode file of a volume or aggregate.

A "snapshot" is a read-only, persistent, point-in-time image (RPPI) of a data set (and its associated metadata), such as a volume or a logical unit number. A snapshot captures the state of data in a data set at the point in time that the snapshot was taken, allowing the state of the data set to be restored from the snapshot in the event of, for example, data corruption or a catastrophic failure of the storage system. Snapshot™ is a proprietary RPPI process available from Network Appliance, Inc. of Sunnyvale, Calif. as part of the Data ONTAP® storage system. In contrast to conventional RPPI approaches (which capture the state of an entire volume or LUN), the Data ONTAP® Snapshot™ consists of pointers to blocks in the active file system only, conserving storage space and reducing the number of duplicate blocks among snapshots.

In conventional file servers there is a fixed relationship between a volume and the regions of disk space that are associated with them. This fixed relationship means that any given disk block may only be used by a particular volume and cannot be used by another volume. Thus, even if a volume is only using a fraction of the space on its associated disks, the unused space is reserved for the exclusive use of the volume.

To overcome these limitations and other limitations of traditional volumes, a technology called FlexVol™ has been developed by Network Appliance, Inc of Sunnyvale, Calif., and is available in filers made by Network Appliance as a feature of the Data ONTAP® storage operating system. FlexVol™ technology provides a kind of volume called a "flexible volume." A flexible volume is analogous to a traditional volume in that it is managed as a file system, but unlike a traditional volume, it is treated separately from the underlying physical storage that contains the associated data. A flexible volume is, therefore, a set of stored data associated with a collection of mass storage devices, such as disks, which obtains its storage from an aggregate, and which is managed as a single administrative unit (i.e., as a single file system), but which is flexibly associated with the underlying physical storage.

With FlexVol™ technology an aggregate can contain multiple flexible volumes. Hence, flexible volumes can be flexibly associated with the underlying physical storage block characteristics. Further, to reduce the amount of wasted storage space, any free block in an aggregate can be used by any flexible volume in the aggregate. A flexible volume can be grown or shrunk in size. Furthermore, blocks can be committed to flexible volumes on the fly from available storage.

In the FlexVol™ system, every block is associated with both a logical location and a physical location in storage. The logical location is the virtual volume block number (VVBN) and the physical location is the physical volume block number (PVBN).

OVERVIEW OF THE TECHNIQUE

The following is an overview of the defragmentation technique, in accordance with certain embodiments of the invention. A storage server maintains various hierarchical data structures, called buffer trees, to keep track of the organization of blocks stored in an aggregate. A buffer tree may represent, for example, a volume defined within an aggregate or a file defined within a volume. For any particular file, there are generally two relevant buffer trees, a container file buffer tree (hereinafter "container buffer tree") and a user file buffer tree (hereinafter "user buffer tree"). The user buffer tree represents the particular file, while the container buffer tree represents the volume which contains the file. Normally, the user buffer tree is used to locate blocks in a file in response to a client-initiated read or write request.

Each buffer tree typically references numerous blocks. Some of these blocks, data blocks, contain actual data. Some blocks in a buffer tree, indirect blocks, contain pointers to other blocks. There can be multiple levels of indirect blocks in a buffer tree. In some file systems, such as the WAFL® file system available from Network Appliance of Sunnyvale, Calif., there is one and only one level of data blocks, which is the lowest level of the buffer tree, such that the length of the path from the root node of the buffer tree to each data block is the same. In other file systems, there may be multiple levels of data blocks such that the length of the path from the root node of the buffer tree to each data block may be different. The root node of the buffer tree is known as an inode, which is a metadata structure that contains metadata about the file.

Every inode and indirect block in the user buffer tree includes a pair of associated pointers for every lower level block that it references: a physical volume block number (PVBN) and a virtual volume block number (VVBN). Every inode and indirect block in the container buffer tree also includes a PVBN for every lower level block that it references. A PVBN is an address of a physical block in an aggregate. A VVBN is an address of the block in the (logical) volume which contains the file (e.g., an offset address of the block within the volume). The relevance of these pointers to the defragmentation technique introduced here is discussed below.

One of the features of a write-anywhere file system is that a block which is modified while it is in cache memory (e.g., where the client issues a read request followed by a write to the same location) can be written to a new disk location without changing the data in the original disk location. This, in turn, allows snapshots of the client's data at previous points in time to be preserved (e.g., for data recovery).

Read performance in a file system is generally best when the data resides on disk (or other non-volatile storage) in long, contiguous segments or "chains," such as a large number of consecutive blocks across each disk in a RAID group. Write out-of place file systems tend to fragment files over time, because long contiguous segments of unallocated blocks are not always available. Large files subject to a random overwrite load are especially affected. Random read performance gradually deteriorates as the file is smeared (fragmented) over the disk and segment lengths decrease. In addition, consistency point performance and sequential read performance fall sharply as CP RAID segment lengths (i.e., contiguous extents of consistency point data in a RAID array) go down.

The level of data fragmentation can be determined during normal read operations as data is copied from disk storage to cache memory. The need for defragmentation can be based on a predetermined policy or algorithm that examines parameters related to data fragmentation (e.g., segment length statistics, number of segments and/or the number of blocks in the read request, etc.). For example, such policies and/or algorithms can be implemented as an integral part of file management software or entered manually by a system administrator through a user interface. However, the specific manner for making such a decision is not germane to the defragmentation techniques introduced here.

Defragmentation involves moving various blocks to new locations in the aggregate (i.e., relocating blocks). In accordance with the defragmentation technique introduced here, certain blocks are identified for relocation for defragmentation purposes, during the course of normal read operations by the storage server, by setting metadata flags in the read buffer when the system determines that the data in the read buffer should be defragmented, even if the read buffer is clean (i.e., the buffer data matches the on-disk data). This buffer state (i.e., clean and fragmented) is referred to herein as "pseudo-dirty." As defined above, a "clean" buffer is a buffer with data that has not been modified (e.g., by a client initiated write request). Data in a clean buffer can normally be ignored at the next CP because the on-disk data is the same data with the same VVBN and PVBN. A "dirty" buffer is a buffer containing modified data (i.e., data different from the on-disk data). Blocks in a dirty buffer are written to disk in new locations (new PVBNs) with new VVBNs at the next consistency point. In the case of a "pseudo-dirty" buffer, the blocks are written to disk in new, contiguous locations (new PVBNs) with their existing VVBNs at the next consistency point, indicating that the data has not changed.

According to embodiments of the defragmentation technique provided herein, a "pseudo-dirty" buffer contains unmodified but fragmented data. When the file system manager detects fragmentation, it marks the buffer pseudo-dirty, so that the fragmented data (i.e., from non-contiguous segments) can be reallocated to new PVBNs corresponding to unallocated, sequential disk block numbers, without changing the VVBNs of the blocks. As a result, segments can be combined into longer segments when they are written to disk at the next consistency point (i.e., all of the blocks in the segment are both logically and physically contiguous); at least to the limits of contiguous, unallocated disk space. The fact that the data have not changed is reflected in the absence of VVBN changes. Snapshot space usage does not change because the data have not changed.

In some storage servers, as noted above, data is stored in logical containers called volumes and aggregates. As previously defined, an "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. As defined above, a "file system" is an independently managed, self-contained, hierarchal set of data units (e.g., files or LUNs). Although a volume or file system (as those terms are used herein) may store data in the form of files, such is not necessarily the case. That is, a volume or file system may store data in the form of other units of data, such as LUNs.

It is assumed here that a storage system that implements the defragmentation technique introduced here is capable of creating and maintaining flexible volumes as defined above, either exclusively or as part of a mixed storage system containing both flexible volumes and traditional (i.e., non-flexible) volumes. Recall that a "flexible volume" is flexibly associated with the underlying aggregate. A logical block in a flexible volume can be mapped to any physical block in an aggregate containing the flexible volume. An aggregate can contain one or more flexible volumes. Henceforth in this description, all references to a "volume" or "volumes" shall refer to flexible volumes.

Figure 1:
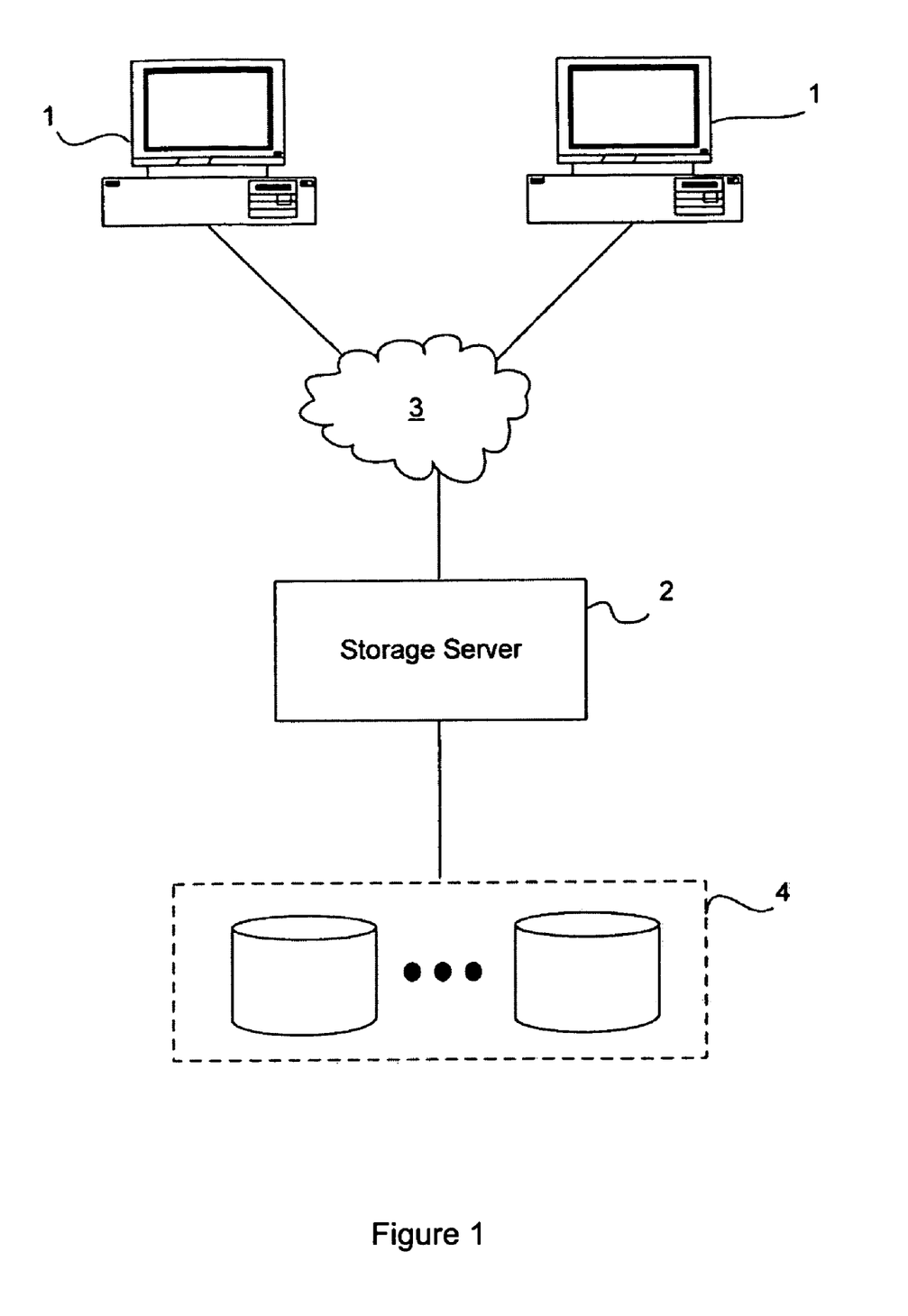
FIG. 1 illustrates a storage network environment which includes a storage server.

FIG. 1 shows a simple example of a network environment which incorporates a storage server 2, in which the defragmentation technique introduced here can be implemented. For example, the defragmentation technique can be adapted for use in other types of storage systems, such as storage servers which provide clients with block-level access to stored data or processing systems other than storage servers. The storage server 2 is coupled to a storage subsystem 4 which includes a set of mass storage devices, and to a set of storage clients 1 (hereinafter simply "clients") through a network 3. The network 3 may be, for example, a local area network (LAN), a wide area network (WAN), a storage area network (SAN), a Fibre Channel fabric or a combination of such networks. Each of the clients 1 may be, for example, a conventional personal computer (PC), server-class computer, workstation or the like.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

Although illustrated as a self-contained element, the storage server 2 may have a distributed architecture; for example, it may include a separate N-("network") module and D-(disk) module (not shown). In such an embodiment, the N-module is used to communicate with clients 1, while the D-module includes the file system functionality and is used to communicate with the storage subsystem 4. The N-module and D-module communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
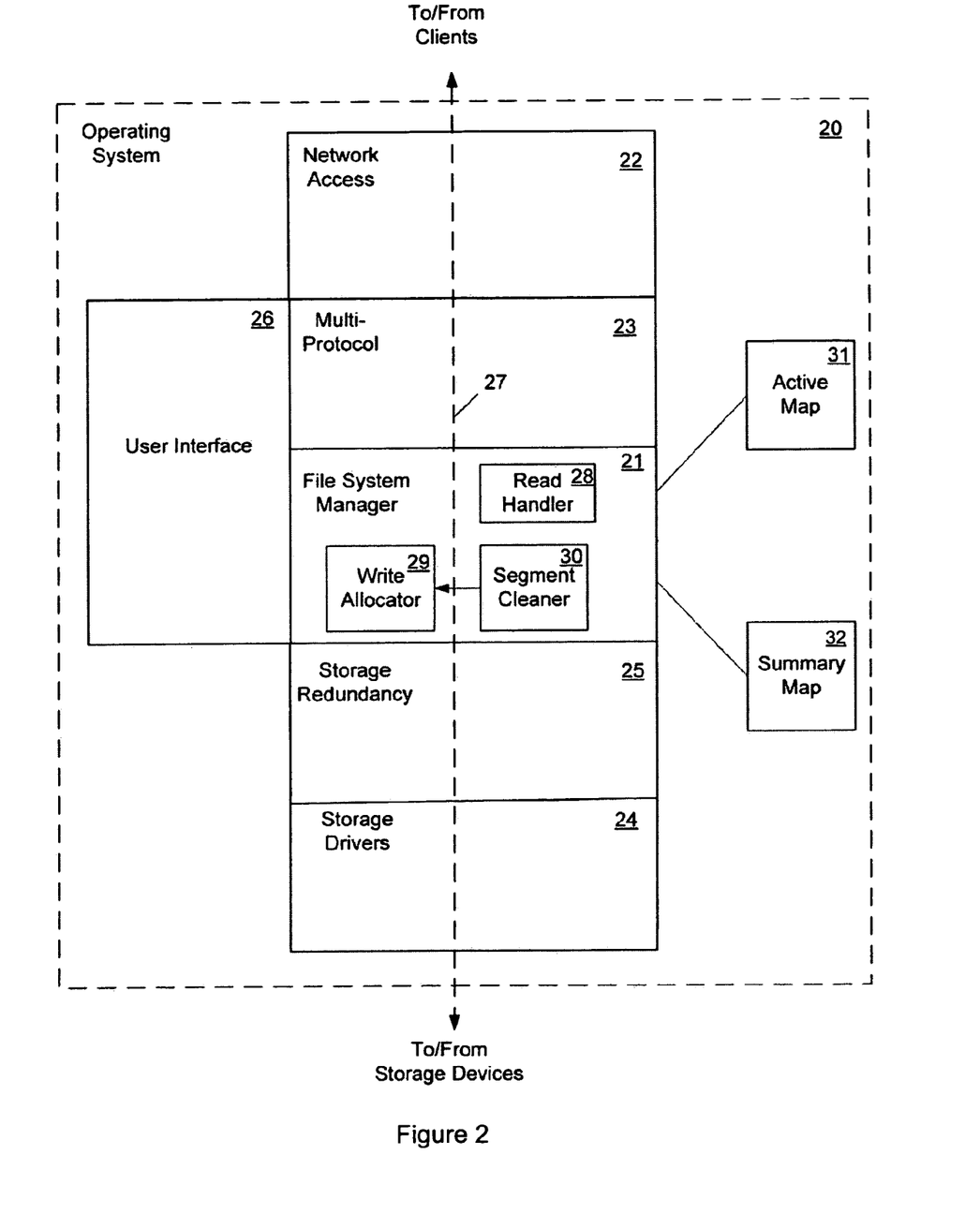
FIG. 2 illustrates the architecture of the operating system of the storage server.

The storage server 2 includes an operating system to control its operation, an example of which is shown in FIG. 2. The operating system 20 and its constituent elements are preferably implemented in the form of software. However, in some embodiments, some or all of the elements of the operating system may be implemented in the form of hardware (e.g., specially designed circuitry), or as a combination of hardware and software.

As shown, the operating system 20 includes several modules, or "layers." These layers include a file system manager 21. The file system manager 21 is software that manages the one or more file systems managed by the storage server 2. In particular, the file system manager 21 imposes a hierarchy (e.g., a directory/file structure) on the data stored in the storage subsystem 4 and manages client-initiated read and write operations at a high level (while delegating certain functions to lower layers of the operation system 20).

To allow the storage server 2 to communicate over the network 3 (e.g., with clients 1), the operating system 20 also includes a network access layer 22, and a protocol layer 23 operatively coupled between the file system manager 21 and the network access layer 23. The protocol layer 22 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 23 includes one or more drivers which implement one or more lower-level protocols to communicate over the network, such as Ethernet or Fibre Channel.

To enable the storage server 2 to communicate with the storage subsystem 4, the operating system 20 includes a storage driver layer 24, and a storage access layer 25 operatively coupled between the file system manager 21 and the storage driver layer 24. The storage access layer 25 implements a higher-level disk storage technique, such as RAID-4, RAID-5 or RAID-DP, while the storage driver layer 24 implements a lower-level storage device access technique, such as Fibre Channel Protocol (FCP) or SCSI. The storage access layer 25 is alternatively called the "RAID layer" in this description.

Also shown in FIG. 2 is the path 27 of data flow, through the operating system 20, associated with a client-initiated read or write request.

The operating system 20 also includes a user interface 26 to generate a command line interface (CLI) and/or graphical user interface (GUI), to allow administrative control and configuration of the storage server 2, from a local or remote terminal.

The file system manager 21 also includes a read handler 28, a write allocator 29 and a segment cleaner 30. The read handler 28 is responsible for processing client-initiated read requests. This functionality includes sending appropriate commands, messages and/or metadata to the storage access layer 25 for purposes of responding to such a request. The write allocator 29 is responsible for determining an appropriate storage destination whenever a block is written. The segment cleaner 30 is responsible for determining which segments (where each segment is a group of contiguous disk blocks) to move during defragmentation, as described further below. Accordingly, the segment cleaner 30 provides information on its determinations to the write allocator 29, which decides where to place relocated blocks.

The operating system 20 also maintains two special types of data structures used by the file system manager 21 to keep track of used and free space in the storage subsystem 4. These data structure types include an active map 31 and a summary map 32. A separate instance of each of these two data structures is maintained for each aggregate and for each flexible volume managed by the storage server 2. A free space map can be inferred from the active map and the summary map The active map 31 of a volume indicates which PVBNs are currently used (allocated) in an active file system. The summary map 32 indicates which blocks in the volume are used by Snapshots™. As noted above, a Snapshot™ is the Network Appliance implementation of a read-only, persistent, point-in-time image (RPPI) of a data set and its associated metadata.

In embodiments of the invention, an aggregate is represented (implemented) as a volume within the storage server 2, and each volume in the aggregate is represented (implemented) as a file, referred to as a "container file", within the volume that represents the aggregate.

An aggregate utilizes a PVBN space that defines the storage space of blocks provided by the disks in the aggregate. Each volume utilizes a logical or "virtual" volume block number (VVBN) space to organize those blocks as files. A PVBN, therefore, is an address of a physical block in the aggregate. A VVBN is an address of a block in a volume (the same block as referenced by the corresponding PVBN), i.e., the offset of the block within the container file that represents the flexible volume. Each VVBN space is an independent set of numbers that corresponds to locations within the file, which locations are then translated to disk block numbers (DBNs) on disk. Since a volume is a logical (not physical) data container, it has its own block allocation structures (e.g., active map and summary map) in its VVBN space.

Each volume is essentially a separate file system that is "mingled" onto a common set of storage in the aggregate by the operating system 20. The RAID layer 25 builds a RAID topology structure for the aggregate that guides each file system when performing write allocation. The RAID layer 25 also presents to the file system manager 21 a mapping of each PVBN to a corresponding disk number and DBN (and vice versa).

Each file in the aggregate is represented in the form of a user buffer tree. A buffer tree is a hierarchical structure which used to store metadata about the file, including pointers for use in locating the blocks for the file. A buffer tree includes one or more levels of indirect blocks (called "L1 blocks," "L2 blocks," etc.), each of which contains one or more pointers to lower-level indirect blocks and/or to the data blocks (called "L0 blocks") of the file.

The root of a buffer tree is the "node" of the file. An inode is a metadata container which used to store metadata about the file, such as ownership of the file, access permissions for the file, file size, file type and pointers to the highest level of indirect blocks for the file. Each file has its own inode, and each inode is stored in a corresponding inode file for the volume. Each inode file is also represented as a buffer tree, where each data block of the inode file's buffer tree is an inode.

Figure 3:
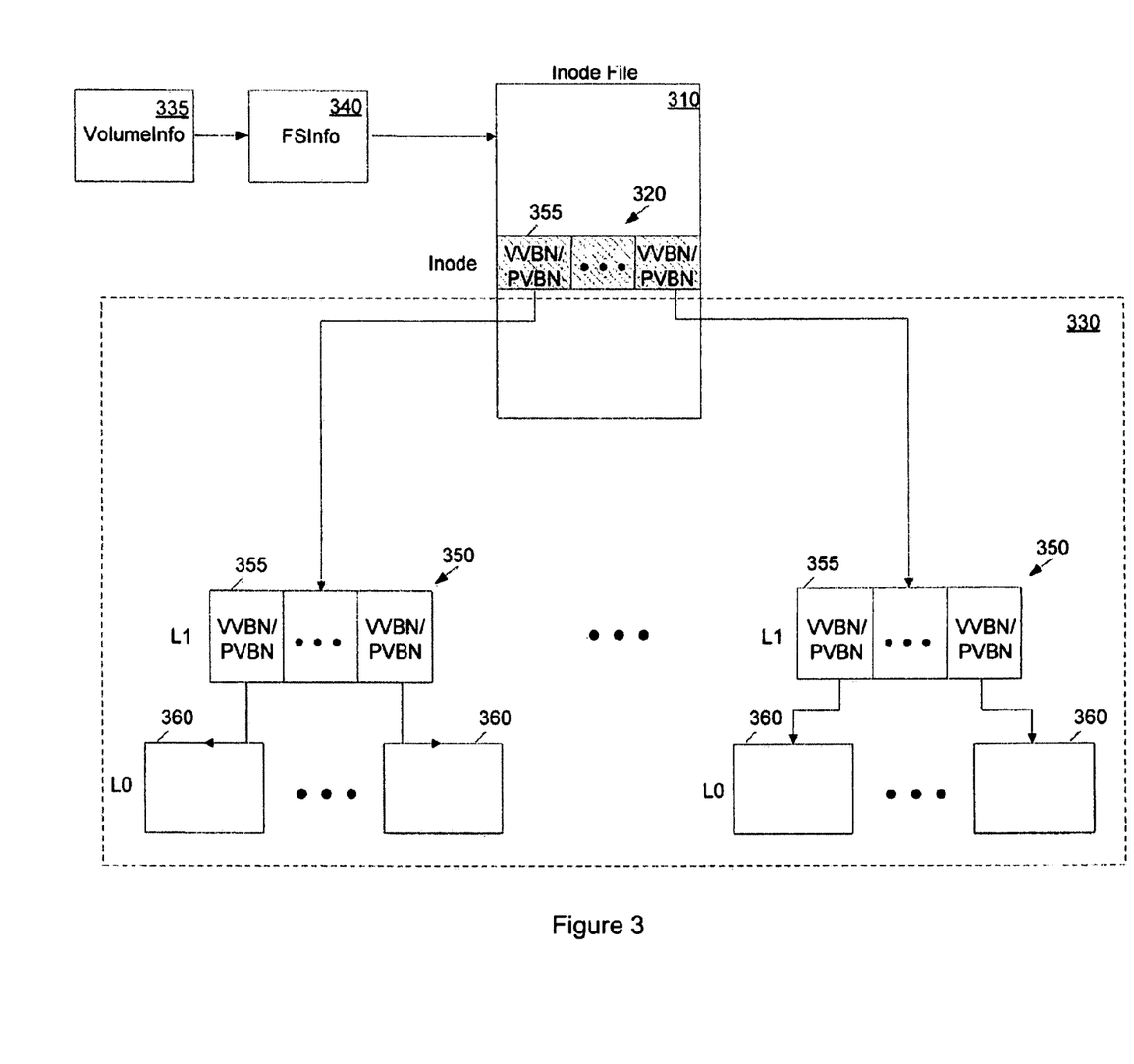
FIG. 3 illustrates an example of a buffer tree.

FIG. 3 shows an example of a buffer tree 330 for a file within a volume. The file is assigned an inode 320, which in the illustrated embodiment directly references Level 1 (L1) indirect blocks 350. To simplify description, FIG. 3 illustrates an embodiment with only two levels of blocks below the inode, i.e., one level of indirect (L1) blocks 350 and one level of direct (L0) blocks 360. However, the storage server 2 may allow three or more levels of blocks below the inode 320, i.e., two or more levels of indirect blocks (e.g., L1, L2, etc.) and one level of direct (L0) blocks.

Each inode 320 and each indirect block 350 includes at least one storage location ("index") 355 that stores at least one PVBN and a corresponding VVBN. Each PVBN identifies a physical block in the aggregate itself (which may be a direct or indirect block) and the corresponding VVBN identifies the logical block number of that block in the volume. Note that the PVBN and VVBN in any given index 355 both refer to the same block, although one is a physical address and the other is a logical address. The inode and indirect blocks in FIG. 3 are shown pointing to only two lower-level blocks each in FIG. 3, to simplify description. However, any inode 320 or indirect block 350 can actually include more than two PVBN-VVBN pairs, and thus, may refer to a greater number of direct (L0) blocks 360.

As mentioned above, each volume is implemented in the storage system as a file, referred to as a "container file," which is represented by a special buffer tree (the "container buffer tree"). A container buffer tree can have a structure similar to the tree structure of a user file, as shown in FIG. 3. However, a container buffer tree's indirect blocks store only PVBNs, not VVBNs. Every block in a container file represents one VVBN for the flexible volume that the container file represents. Therefore, the L1 indirect blocks of a container buffer tree form a mapping of VVBNs to PVBNs and may therefore be referred to as the "container map" for the flexible volume. The flexible volume has a virtual volume ID (WID), which is the inode number of its associated container buffer tree.

The container file may be thought of as one large, virtual disk, which contains all blocks owned by the volume it represents. A VVBN in a user buffer tree also represents the file block number (FBN) of the corresponding block within the container file. An FBN of a given block identifies the offset of the block within the file that contains it. A block referenced by a given VVBN, say VVBN X, in a volume can be found at FBN X in the container file. Since each volume in the aggregate has its own distinct VVBN space, one container file in the aggregate may have an FBN X that is different from FBN X in another container file in the aggregate.

Referring again to FIG. 3, for each file system stored by the storage system, the inodes of each file within that file system are stored in a separate inode file 310. Thus, a separate inode file 310 is maintained for each file system within each volume in the storage system. Note that each inode file 310 is itself represented as a buffer tree (although not shown that way in FIG. 3), where each data block of the inode file's buffer tree is an inode 320.

Each inode 320 in an inode file 310 is the root of the user buffer tree 330 of a corresponding file. The location of the inode file 310 for each file system is stored in a "superblock," a metadata container called a file system information ("FSInfo") block" 340. The FSInfo block 340 contains metadata for the file system rather than for individual files within the file system. Another metadata container, called a volume information ("VolumeInfo") block 335, may be used to store metadata about the volume as a whole, including the locations of the FSInfo block 340 for each file system within that volume. The FSInfo block and the VolumeInfo block (if it is used) are typically stored in fixed (and redundant) on-disk locations so that they may be located during system boot-up.

An aggregate is also represented in the storage server as a volume. Consequently, the aggregate is assigned its own superblock, which contains metadata of the aggregate and points to the inode file for the aggregate. The inode file for the aggregate contains the inodes of all of the flexible volumes within the aggregate, or more precisely, the inodes of all of the container files within the aggregate. Hence, each volume has a structure such as shown in FIG. 3, and the aggregate itself also has a structure such as shown in FIG. 3. As such, the storage system implements a nesting of file systems, where the aggregate is one file system and each volume within the aggregate is also a file system.

As a result of this structure and functionality, every direct (L0) block within a flexible volume is referenced by two separate buffer trees: a user buffer tree (the buffer tree of the file which contains the block) and a container buffer tree (the buffer tree of the container file representing the volume which contains the block).

Note that version 7.0 and later versions of the Data ONTAP® storage operating system from Network Appliance enable the creation and use of flexible volumes, using multi-level buffer trees with dual PVBN-VVBN pointers to blocks in the manner described in FIG. 3 and container buffer trees to represent flexible volumes as described above.

Figure 4:
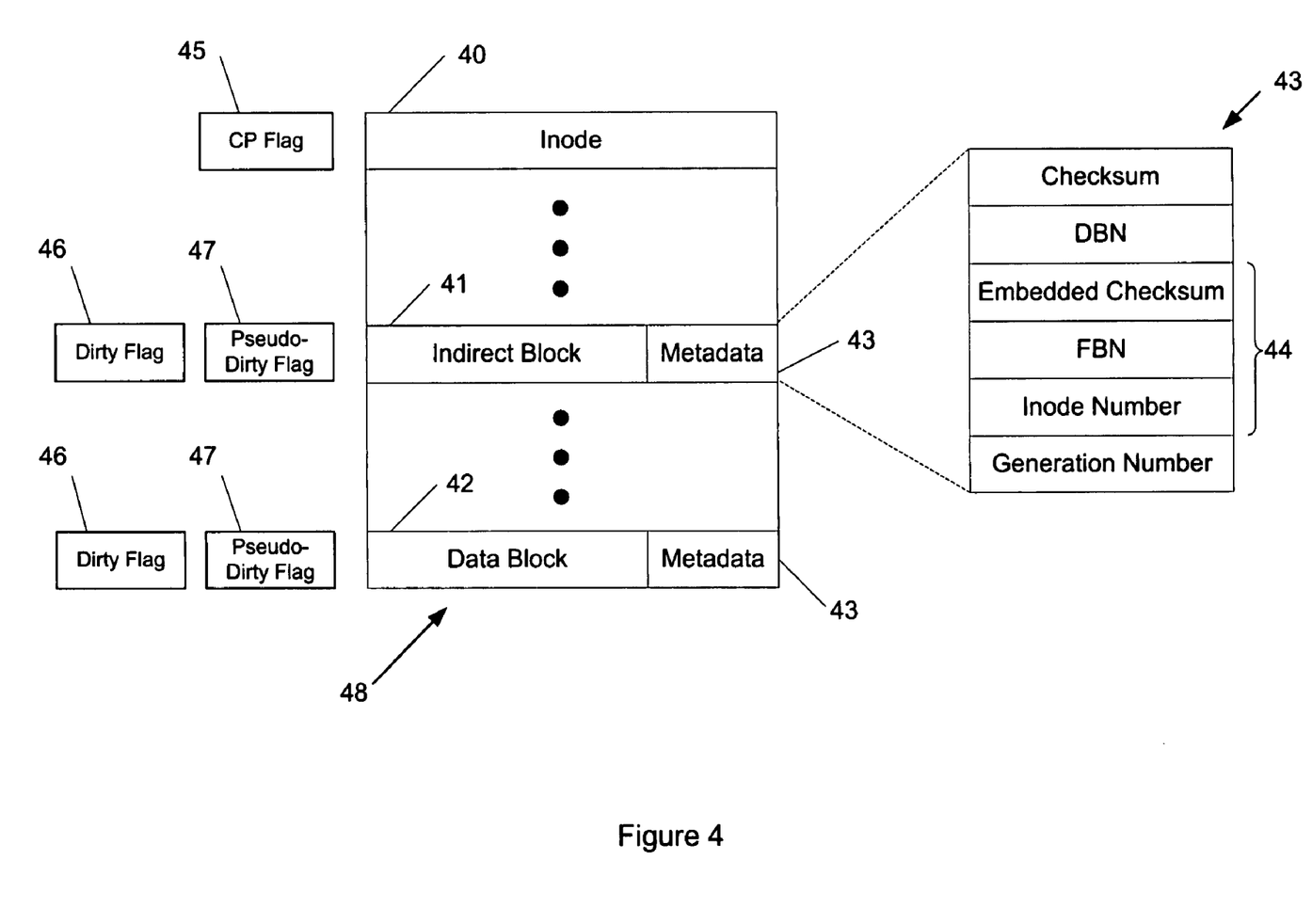
FIG. 4 illustrates blocks stored with appended metadata.

FIG. 4 illustrates the contents of a buffer tree 48 (without illustrating detailed internal paths). Buffer tree 48 includes an inode 40, one of more indirect blocks 41 and one or more data blocks 42. Each indirect block 41 and each data block 42 has an appended metadata field 43. Each metadata field 43 includes a checksum for the block, the DBN of the block, and an embedded checksum for the metadata field itself. In addition, each metadata field also includes context information 44, created by the file system manager 31 for that block, including the FBN, inode number and generation number of the block. The inode number identifies the inode of the file which contains the block. The generation number is an increasing counter used to determine how many times the block has been written in place. Note that in the case of a flexible volume, the FBN and inode number are those of the corresponding container file. In that case, the FBN represents the VVBN within the flexible volume.

As mentioned above, the defragmentation technique introduced here examines metadata flags that are associated with the blocks in a memory buffer. As illustrated in FIG. 4, inode 40, every indirect block 41 and every data block 42 in a buffer tree 48 has one or more associated metadata flags. Each indirect block 41 and each data block 42 are associated with a "dirty flag" 46 to indicate that the block should be written to non-volatile storage at the next consistency point because the data in data buffer does not match the data in non-volatile storage. Each indirect block 41 and each data block 42 are also associated with a "pseudo-dirty" flag 47 to indicate that the data in the buffer is to be written for the purpose of defragmentation. The inode of the buffer is associated with a consistency point flag 45 to indicate if the buffer is clean (i.e., all modifications to the inode and its associated buffer tree have been written to non-volatile storage).

Figure 5A:
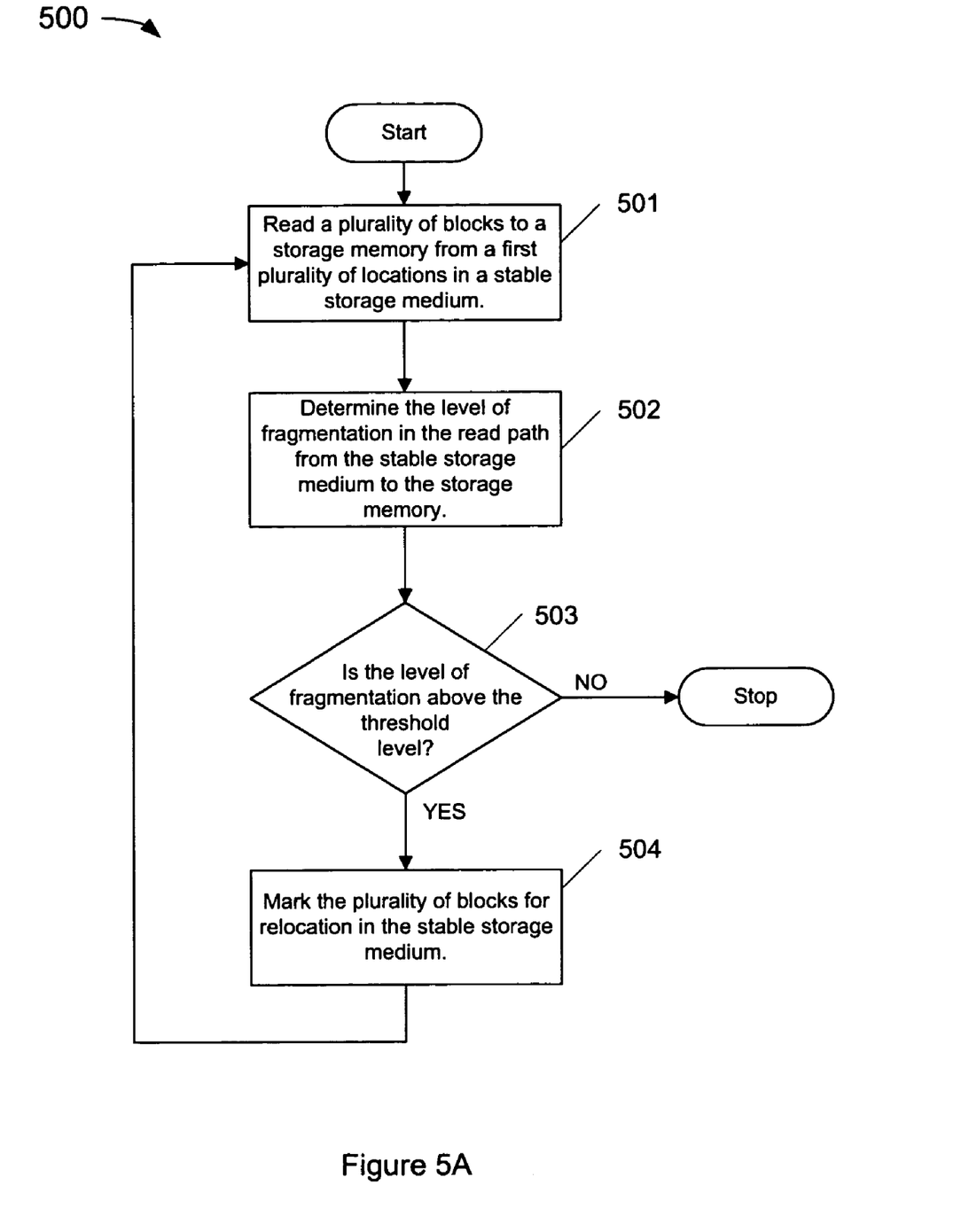
FIGS. 5A and 5B collectively illustrate a process for defragmenting a file.
Figure 5B:
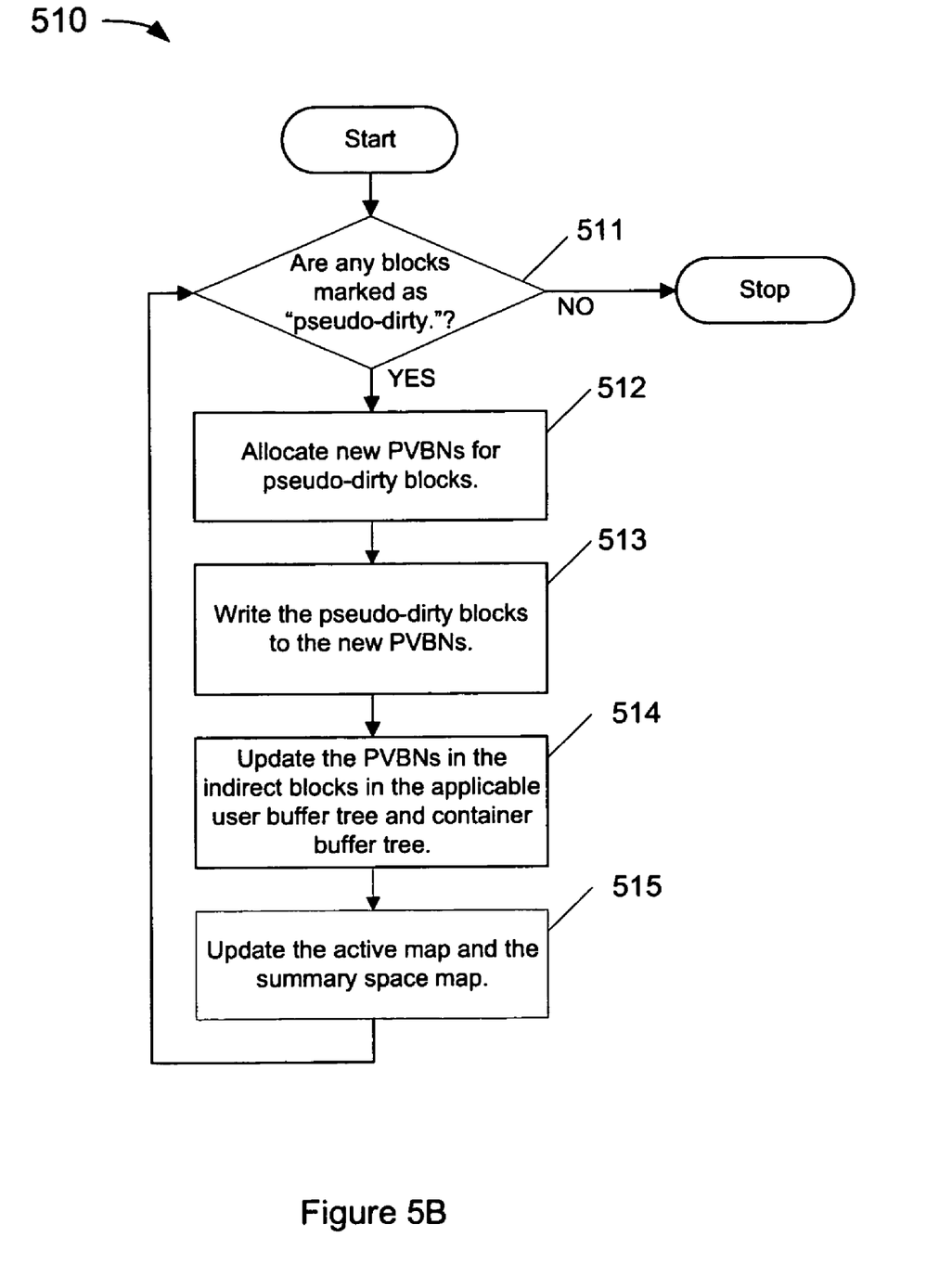

FIGS. 5A and 5B collectively illustrate an example of processes which may be performed by the storage server 2 to defragment data in the normal course of responding to a user initiated read request. FIG. 5A shows a process 500 performed by the file system manager 21 to determine which segments can or should be relocated. This process can be performed at the time of a user-initiated read which affects the blocks on a given disk. FIG. 5B shows a process 510 by which the segments identified for relocation are actually moved. The process of FIG. 5B is performed at each "consistency point." As noted above, a consistency point is the recurring event at which any new or modified data that has been temporarily cached in the storage server's memory is committed to non-volatile storage (e.g., disks or a non-volatile write cache).

Referring now to FIG. 5A, in response to a read request, at 501 a plurality of blocks are read to a data structure (e.g., user buffer tree 33) in cache memory, from a first plurality of locations in non-volatile storage. At 502, the level of fragmentation of the data is determined. As noted above, this determination can be made based on a predetermined defragmentation policy (which is not germane to the defragmentation technique introduced here).

At 503, if it is determined that the level of fragmentation is below a threshold level, the process ends. If it is determined that the level of fragmentation is at or above the threshold level, then the process continues to 504. The threshold level of fragmentation may represent, for example, an average length of data segments in a data read, the number of non-contiguous data segments in a data read or any other metric that a system administrator may wish to reflect a level of fragmentation. At 504, the process marks the plurality of blocks for relocation in the non-volatile storage. This can be done by using metadata flags associated with the blocks which have been read to the cache memory.

The inode of a user buffer tree is associated with a consistency point flag (e.g., CP flag 45) to indicate if the inode and the blocks it references are in a consistency point (i.e., the buffer is clean). Each indirect block and data block in the user buffer tree is associated with a "dirty" flag (e.g., dirty flag 46) to indicate when the block contains data that has been modified (e.g., data has been written to the buffer by the user) and not updated to on-disk storage. Each indirect block and direct block in the user buffer tree is also associated with a "pseudo-dirty" flag (e.g., pseudo-dirty flag 47) to indicate when a block is to be written to non-volatile storage for defragmentation, independent of the state of the dirty flag. In the defragmentation technique described herein, the CP flag associated with the inode of the buffer tree will be cleared to indicate that data in the buffer tree needs to be written to non-volatile storage whenever a dirty flag or a pseudo-dirty flag is set for any block in the buffer tree. Once the inode is flagged as described above, any blocks in the buffer that are marked as dirty or pseudo-dirty can be written to non-volatile storage at the next consistency point. The process then loops back to 501, as described above.

The process 510 of FIG. 5B occurs at each consistency point (note that FIG. 5B represents only those operations which relate to the defragmentation technique being introduced here, not every operation that may occur at a consistency point). Initially, at 511 the process identifies the blocks marked as "pseudo-dirty" (i.e., data that is unmodified and fragmented). If no blocks are marked as pseudo-dirty, the process ends. If one or more blocks are marked as pseudo-dirty, at 512 the process allocates new, contiguous, on-disk locations (i.e., new PVBNs) for those blocks without changing the logical block numbers (VVBNs) for those blocks. The process then writes the blocks to the new PVBNs at 513. Next, at 514 the process updates the PVBNs in the indirect blocks in the applicable user buffer tree and container buffer tree. Specifically, the PVBNs for the relocated blocks are updated in the user buffer tree and the container buffer tree(s) to reflect the blocks' new locations. At 515 the process updates the active map 31 (see FIG. 2) to reflect the fact that the PVBNs corresponding to the new locations are now in use by the active file system, and updates the free space map 32 to reflect the fact that the PVBNs corresponding to the old locations are now free (available for reuse).

Note that the defragmentation technique introduced above allows blocks to be relocated even if those blocks are included in a RPPI, such as a conventional snapshot or a NetApp Snapshot™ as described above, which consists only of pointers to blocks in the active file system and reduces the amount of block duplication relative to other RPPI techniques. The availability of the container buffer tree and its use in the manner described above enables even blocks that are included in an RPPI to be moved for defragmentation without losing the ability to locate those blocks when necessary, because the VVBNs of the relocated blocks are not changed.

Figure 6:
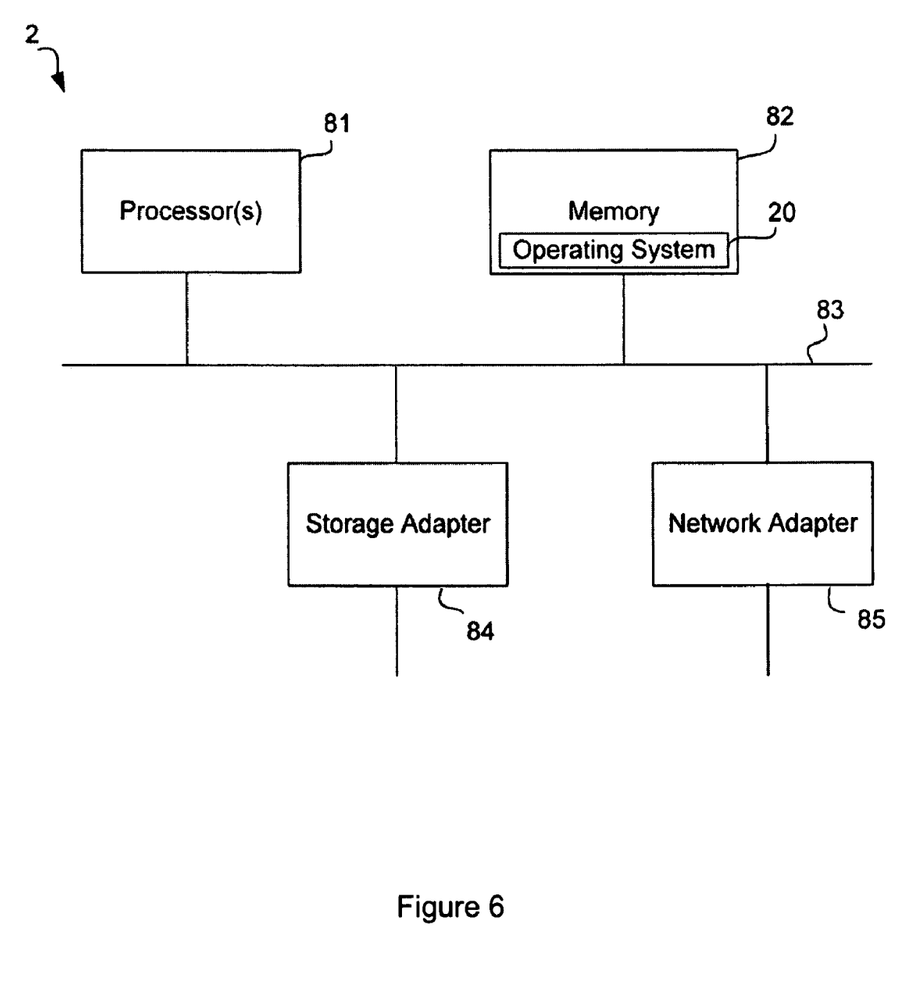
FIG. 6 illustrates an example of the hardware architecture of the storage server.

FIG. 6 is a block diagram showing an example of the architecture of the storage server 2 at a high level. Certain standard and well-known components which are not germane to the present invention are not shown. The storage server 2 includes one or more processors 81 and memory 82 coupled to a bus system 83. The bus system 83 shown in FIG. 8 is an abstraction that represents any one or more separate physical buses and/or point-to-point connections, connected by appropriate bridges, adapters and/or controllers. The bus system 83, therefore, may include, for example, a system bus, a form of Peripheral Component Interconnect (PCI) bus, Hyper-Transport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 81 are the central processing units (CPUs) of the file server 2 and, thus, control its overall operation. In certain embodiments, the processors 81 accomplish this by executing software stored in memory 82. Such processor 81 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 82 includes the main memory of the file server 2. Memory 82 represents any form of random access memory (RAM), read-only memory (ROM), flash memory, or the like, or a combination of such devices. Memory 82 stores (among other things) the storage server's operating system 20, which can implement the defragmentation technique introduced herein.

Also connected to the processors 81 through the bus system 83 are a storage adapter 84 and a network adapter 85. The storage adapter 84 allows the file server 2 to access the storage subsystem 4 and may be, for example, a Fibre Channel adapter or a SCSI adapter. The network adapter 85 provides the file server 2 with the ability to communicate with remote devices, such as the clients 1, over a network and may be, for example, an Ethernet adapter, a Fibre Channel adapter or the like.

Software to implement the defragmentation technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
maintaining, by a storage server, a first set of pointers and a second set of pointers to data stored in a storage system, the first set of pointers including physical pointers that define physical addresses of a plurality of blocks in the storage system, the second set of pointers including logical pointers that define logical addresses of each of the plurality of blocks in the storage system;
reading a set of blocks from non-volatile storage in response to a read request;
determining a level of fragmentation associated with the read request; and
if the level of fragmentation exceeds a predetermined threshold level, modifying the physical pointers associated with each block of the set of blocks so that the set of blocks are stored in contiguous addresses in the non-volatile storage, without modifying the logical pointer to any block of the set of blocks.

2. A method, comprising:
reading, by a storage server, a plurality of blocks to a cache memory from a first plurality of locations in non-volatile storage, wherein each block is identified by a physical address and by a logical address;
determining a level of data fragmentation in the plurality of blocks;
marking the plurality of blocks for relocation in the non-volatile storage if the level of data fragmentation exceeds a threshold level; and
writing the plurality of blocks to a second plurality of locations in the non-volatile storage at a consistency point, wherein the second plurality of locations comprises contiguous locations in the non-volatile storage, wherein the physical address of each block is modified and the logical address of each block is unmodified.

3. The method of claim 2, further comprising de-allocating the first plurality of locations from an active file system and allocating the second plurality of locations to the active file system.

4. The method of claim 2, wherein the plurality of blocks comprises a first data structure, wherein each block contains metadata, the metadata comprising the physical address of the block and the logical address of the block, the first data structure comprising a root node containing indices to one or more indirect blocks, indirect blocks containing indices to one or more other indirect blocks, the one or more other indirect blocks containing indices to one or more data blocks.

5. The method of claim 4, wherein the physical address of a block comprises a disk block number (DBN) and the logical address of the block comprises a file block number (FBN).

6. The method of claim 4, wherein the indices to the one or more indirect blocks, the indices to the one or more other indirect blocks and the indices to the one or more data blocks each comprise a first pointer and a second pointer, the first pointer comprising a physical volume block number (PVBN) corresponding to a particular DBN in the metadata of a particular block, the second pointer comprising a virtual volume block number (VVBN) corresponding to a particular FBN in the metadata of the particular block, wherein a second data structure maintains a VVBN to PVBN mapping for each block in the volume.

7. The method of claim 4, wherein each block contains additional metadata, wherein the additional metadata in each block includes a first flag and a second flag, wherein marking the plurality of blocks for relocation comprises setting a condition of the first flag and the second flag of the root node and propagating the condition to the indirect blocks and the data blocks in the first data structure.

8. The method of claim 7, wherein the first flag comprises a dirty data flag and the second flag comprises a consistency point flag, and wherein the condition comprises setting the dirty data flag and setting the consistency point flag.

9. The method of claim 6, wherein writing the plurality of blocks to the second plurality of locations comprises mapping VVBNs of the plurality of blocks in the first data structure to a plurality of PVBNs in the second data structure, the plurality of PVBNs corresponding to the second plurality of locations in the non-volatile storage.

10. The method of claim 2, wherein one or more blocks in the plurality of blocks is part of a read-only persistent point-in-time image of a data set, and wherein writing the plurality of blocks to the second plurality of locations does not consume snapshot space.

11. A storage server, comprising:
   a communications interface to receive a data access request from a client;
   a storage interface through which to access a mass storage subsystem on behalf of the client in response to the data access request; and
   a file system manager, comprising:
      a read handler to read a plurality of blocks to a cache memory from a first plurality of locations in non-volatile storage, wherein each block is identified by a physical address and a logical address;
      a segment cleaner to determine a level of data fragmentation in a read path from the non-volatile storage to the cache memory and to mark the plurality of blocks for relocation in the non-volatile storage if the level of data fragmentation exceeds a threshold level; and
      a write allocator to write the plurality of blocks to a second plurality of locations in the non-volatile storage at a consistency point, wherein the second plurality of locations comprises contiguous locations in the non-volatile storage, wherein the physical address of each block is modified and the logical address of each block is unmodified.

12. The storage server of claim 11, further comprising an active map to allocate the second plurality of locations to an active file system and a free space map de-allocate the first plurality of locations from the active file system.

13. The storage server of claim 11, wherein the file system manager is configured to generate a first data structure comprising the plurality of blocks, wherein each block contains metadata, the metadata comprising a physical address of the block in an aggregate and a logical address of the block in a volume, the first data structure comprising a root node containing indices to one or more indirect blocks, indirect blocks containing indices to one or more other indirect blocks, the one or more other indirect blocks containing indices to one or more data blocks.

14. The storage server of claim 13, wherein the physical address of a block comprises a disk block number (DBN) and the logical address of the block comprises a file block number (FBN).

15. The storage server of claim 13, wherein the indices to the one or more indirect blocks, the indices to the one or more other indirect blocks and the indices to the one or more data blocks each comprise a first pointer and a second pointer, the first pointer comprising a physical volume block number (PVBN) corresponding to a particular DBN in the metadata of a particular block, the second pointer comprising a virtual volume block number (VVBN) corresponding to a particular FBN in the metadata of the particular block, wherein the file system manger is configured to maintain a second data structure comprising a VVBN to PVBN mapping for each block in the volume.

16. The storage server of claim 13, wherein each block contains additional metadata, wherein the additional metadata in each block includes a first flag and a second flag, wherein to mark the plurality of blocks for relocation, the segment cleaner is configured to set a condition of the first flag and the second flag of the root node and to propagate the condition to the indirect blocks and the data blocks in the first data structure.

17. The storage server of claim 16, wherein the first flag comprises a dirty data flag and the second flag comprises a consistency point flag, and wherein the condition comprises setting the dirty data flag and setting the consistency point flag.

18. The storage server of claim 15, wherein to write the plurality of blocks to the second plurality of locations, the write allocator is configured to allocate VVBNs of the plurality of blocks in the first data structure to a plurality of new PVBNs in the second data structure, the plurality of new PVBNs corresponding to the second plurality of locations in the non-volatile storage.

19. The storage server of claim 13, further comprising a summary map to indicate which blocks in the volume are part of a read-only, persistent point-in-time image (RPPI) of a data set, wherein one or more blocks in the plurality of blocks is part of at least one RPPI, and wherein RPPI space in the summary map is not consumed by the allocation of the VVBNs of the plurality of blocks in the first data structure to the plurality of new PVBNs in the second data structure.

20. An article of manufacture, comprising:
   a machine-accessible storage medium including data that, when accessed by a machine, cause the machine to perform operations, comprising:
   reading a plurality of blocks to a cache memory from a first plurality of locations in non-volatile storage, wherein each block is identified by a physical address and by a logical address;
   determining a level of data fragmentation in a read path from the non-volatile storage to the cache memory;
      marking the plurality of blocks for relocation in the non-volatile storage if the level of data fragmentation exceeds a threshold level; and
      writing the plurality of blocks to a second plurality of locations in the non-volatile storage at a consistency point, wherein the second plurality of locations comprises contiguous locations in the non-volatile storage, wherein the physical address of each block is modified and the logical address of each block is unmodified.

21. The article of manufacture of claim 20, wherein the machine-accessible storage medium further includes data that cause the machine to perform operations comprising:
   de-allocating the first plurality of locations from an active file system; and
   allocating the second plurality of locations to the active file system.

22. The article of manufacture of claim 20, wherein the plurality of blocks comprises a first data structure, wherein each block contains metadata, the metadata comprising a physical address of the block in an aggregate and a logical address of the block in a volume, the first data structure comprising a root node containing indices to one or more indirect blocks, indirect blocks containing indices to one or more other indirect blocks, the one or more other indirect blocks containing indices to one or more data blocks.

23. The article of manufacture of claim 22, wherein the physical address of a block comprises a disk block number (DBN) and the logical address of the block comprises a file block number (FBN).

24. The article of manufacture of claim 22, wherein the indices to the one or more indirect blocks, the indices to the one or more other indirect blocks and the indices to the one or more data blocks each comprise a first pointer and a second pointer, the first pointer comprising a physical volume block number (PVBN) corresponding to a particular DBN in the metadata of a particular block, the second pointer comprising a virtual volume block number (VVBN) corresponding to a particular FBN in the metadata of the particular block, wherein a second data structure maintains a VVBN to PVBN mapping for each block in the volume.

25. The article of manufacture of claim 22, wherein each block contains additional metadata, wherein the additional metadata in each block includes a first flag and a second flag, wherein marking the plurality of blocks for relocation comprises setting a condition of the first flag and the second flag of the root node and propagating the condition to the indirect blocks and the data blocks in the first data structure.

26. The article of manufacture of claim 25, wherein the first flag comprises a dirty data flag and the second flag comprises a consistency point flag, and wherein the condition comprises setting the dirty data flag and setting the consistency point flag.

27. The article of manufacture of claim 24, wherein writing the plurality of blocks to the second plurality of locations comprises mapping VVBNs of the plurality of blocks in the first data structure to a plurality of PVBNs in the second data structure, the plurality of PVBNs corresponding to the second plurality of locations in the non-volatile storage.

28. The article of manufacture of claim 20, wherein one or more blocks in the plurality of blocks is part of a read-only persistent point-in-time image of a data set, and wherein writing the plurality of blocks to the second plurality of locations does not consume snapshot space.

29. A method of defragmentation in a storage system, comprising:
identifying data blocks for defragmentation during a data read operation by setting metadata flags in a read buffer when the storage system determines that data in the read buffer is pseudo-dirty; and
writing the data blocks to contiguous storage locations at a consistency point.

30. The method of claim 29, wherein the metadata flags comprise a clean buffer flag and a fragmented data flag and wherein a pseudo-dirty buffer comprises a clean and fragmented buffer.

31. The method of claim 29, wherein each data block in the read buffer is associated with a physical block number and with a logical block number, and wherein writing the data blocks to the contiguous storage locations comprises associating each data block with the a new physical block number corresponding to the contiguous storage locations.

* * * * *